(12) United States Patent
Portmann (10) Patent No.: US 7,775,181 B2
(45) Date of Patent: Aug. 17, 2010

(54) HEATED PET BRUSH AND ASSOCIATED METHOD

(76) Inventor: Candace Portmann, 6822 S. sparkman St., Unit D, Tampa, FL (US) 33616

( * ) Notice: Subject to any disclaimer, the term of this patent is extended or adjusted under 35 U.S.C. 154(b) by 662 days.

(21) Appl. No.: 11/803,163

(22) Filed: May 14, 2007

(65) Prior Publication Data
US 2007/0295280 A1 Dec. 27, 2007

Related U.S. Application Data

(60) Provisional application No. 60/805,674, filed on Jun. 23, 2006.

(51) Int. Cl.
*A01K 13/00* (2006.01)
(52) U.S. Cl. ...................... 119/612; 119/600
(58) Field of Classification Search ............... 119/612, 119/615, 600, 625; 601/15; 132/120, 220; 15/159.1; 607/79
See application file for complete search history.

(56) References Cited

U.S. PATENT DOCUMENTS 4,314,137 A * 2/1982 Dorn ........................ 219/222
D266,112 S 9/1982 Culp
5,551,949 A * 9/1996 Kim ......................... 601/15
5,626,099 A 5/1997 Stalker
5,768,709 A 6/1998 Newkirk
5,823,145 A * 10/1998 Hingiss ..................... 119/603
6,363,215 B1 * 3/2002 Cafaro ...................... 392/384
7,322,945 B2 * 1/2008 Dunmore ................... 601/15
7,571,731 B2 * 8/2009 Choi et al. ................. 132/148
2007/0150030 A1 * 6/2007 Pearl et al. ................. 607/79
2008/0236604 A1 * 10/2008 Mourad ..................... 132/118

* cited by examiner

*Primary Examiner*—Kimberly S Smith (57) ABSTRACT

The device includes a brush with a body and a gripping end. There are first bristles and second bristles. The bristles have first and second operating temperatures. The device further includes a rechargeable battery, a recharging base station, and a temperature maintaining mechanism. A bridge circuit includes a heat supplying resistor, a temperature determining resistor, and unchanging resistors. Differential amplifiers are coupled to the heat supplying resister and the temperature determining resistor while a transistor is coupled to the heat supplying resistor. A power interrupting mechanism includes pressure sensors with a pressure comparison circuit coupled thereto. A switch is electrically coupled to the first temperature maintaining mechanism. The timer comparison circuit includes a processor, a memory electrically coupled to the processor, and a logic gate electrically coupled to the processor. Such a memory includes software instructions, and a logic gate operates a toggle switch.

12 Claims, 9 Drawing Sheets

HEATED PET BRUSH AND ASSOCIATED METHOD

CROSS REFERENCE TO RELATED APPLICATIONS

This application claims the benefit of U.S. Provisional Application No. 60/805,674, filed Jun. 23, 2006, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to pet brushes and, more particularly, to a heated pet brush for allowing pet owners to effectively and conveniently administer soothing heat therapy when brushing their animal's coat.

2. Prior Art

America is a country of dog and cat lovers. In fact, according to the American Pet Products Manufacturers Association, (APPMA) there are approximately 60 million owned dogs in the United States and 75 million owned cats; therefore, four in ten households include a family dog, while nearly three in ten include a pet cat. Why do so many people have pets? The answer to that question is simple: pets provide unconditional love, companionship and unmatched loyalty to their owners.

Dogs are known as "man's best friend," and they provide protection and happy companionship. Cats are more independent but still offer love and warmth. For many owners, a favorite end to a hectic day is spent curled up on a sofa or chair with a beloved pet nestled nearby. Dogs and cats are often considered a member of the family and most owners provide adequate shelter, a healthy diet and a regular routine of bathing and grooming for their animals.

Brushing your pet's fur is important when caring for an animal. Brushing rids the animal of painful tangles and ensures a healthy, shiny coat. For older pets, extra care must be given to ensure the animal is comfortable, healthy and happy. Specifically, for those who own older animals, a pet owner should make sure the animal visits the veterinarian, receives all medication in a timely manner and is provided with comfortable bedding. Of course, it would be advantageous to provide a means for pet owners to better care for and pamper their household pets.

U.S. Pat. No. 4,254,738 to Stanley discloses a no tangle pet brush that has an L-shaped case with a partially hollow interior for housing a container of grooming solution. The container has a spray attachment for spraying the grooming solution into a chamber which provides means for equally distributing the solution across the full bristle pattern of a brush attached to an angled extension of the brush case. The brush bristles have inner ends which are mounted in the case and which extend into the chamber. The inner ends are suitably mounted to provide means for the flow of solution out of the chamber and onto the individual strands of bristles. A removable end cap is provided for removing and replacing the container of grooming solution and the case has an external operator extending into the interior for operating push button types of spray attachments. A wire slicker brush or any other suitable brush may be used and interchanged by snaps or slide structure as is known in the art. Unfortunately, this prior art example offers no relief for pets that suffer from achy joints caused by arthritis.

U.S. Pat. No. 7,124,712 to Berman discloses a pet brush system including a brush body, which has a central aperture therethrough, and a lower cylindrical peripheral wall of an enlarged diameter and an upper peripheral wall. The brush further includes a handle, which is adapted to be grasped by a user with a free proximal end and a cylindrical distal end with an aperture. A bristle pad is provided with a plurality of bristles which have tips at a location remote from the brush body. The upper ends are coupled to the bristle pad and located within the cylindrical lower wall of the brush body. A push plate includes apertures which receive the bristles therethrough and includes an interior central rod which extends through the central aperture of the brush body to an operator controlled push button secured to the upper end thereof. A spring within the upper cylindrical peripheral wall of the brush body is adapted to push the push button away from the bristle pad and adapted to be contracted upon the depression of the push button to move the central rod downwardly. Unfortunately, this prior art example offers no relief to pets that suffer from achy joints caused by arthritis.

U.S. Pat. No. 6,336,428 to Locke discloses a vacuum pet brush for collecting debris loosened by a grooming brush or comb. The vacuum pet brush includes a main housing that has an open end and closed end. The closed end of the main housing has a plurality of venting apertures. The main housing has enclosed inside a vacuum bag, a fan connected to a motor, and a battery operationally connected to the motor. In addition, a grooming head member that has a debris collection conduit is selectively coupled to the open end of the main housing. Unfortunately this prior art example, while providing a pet owner effective means of grooming their pet, offers to relief to pets that suffer from achy joints caused by arthritis. Accordingly, a need remains for a heated pet brush in order to overcome the above-noted shortcomings. The present invention satisfies such a need by providing a pet brush that is convenient and easy to use, durable yet lightweight in design, and provides pet owners a simple and efficient means of brushing their animal's fur. The hair brush boasts an integrated heating element that allows a pet owner to effortlessly comb through fur, resulting in a shiny, healthy coat. The heated pet brush administers gentle, radiating heat, and easily glides through tangled growth and eliminates the pain and discomfort traditionally associated with combing through thick fur. Most importantly, the inclusion of the integrated heating element enables pet owners to utilize the brush to administer soothing heat therapy to their animal. The heated pet brush gently applies soothing heat therapy to stiff, sore muscles and aching bones, and proves particularly beneficial for use with older animals. The heated pet brush is ideal for home use and proves to be a valuable tool for any professional pet groomer, as well as veterinarians and similar caregivers.

BRIEF SUMMARY OF THE INVENTION

In view of the foregoing background, it is therefore an object of the present invention to provide a device that will provide a pet owner with a method of grooming their pet while also soothing the pet with advantageous heat therapy. These and other objects, features, and advantages of the invention are provided by a heated pet brush for allowing a pet owner to effectively and conveniently administer soothing heat therapy when brushing an animal.

The device includes a brush and a body provided with a proximally located gripping end and a distally located brushing end. Such a brushing end has oppositely facing first and second surfaces. Such a first surface includes a first plurality of bristles extending outwardly therefrom. Such a second surface has a second plurality of bristles extending outwardly therefrom. Such first and second pluralities of bristles conveniently have unique first and second operating temperatures respectively.

The device further includes a rechargeable battery seated within a cavity of the brush and a recharging base station electrically mateable to an external power supply source. Such a battery is electrically engaged with the external power supply source when the gripping end is seated within the base station during non-operating conditions.

The device further includes a user interface situated on the gripping end of the brush and a mechanism for consistently maintaining the first plurality of bristles at the first operating temperature while a caregiver is grooming the animal and applying pressure against the first plurality of bristles. Such a first temperature maintaining mechanism effectively includes a plurality of heating elements operably coupled to the first plurality of bristles and a bridge circuit electrically coupled to the heating elements. Such a bridge circuit advantageously includes a heat supplying resistor, a temperature determining resistor, a plurality of unchanging resistors electrically coupled to the heat supplying resistor and the temperature determining resister. A plurality of differential amplifiers are coupled to such a heat supplying resister and such a temperature determining resistor, and a transistor is electrically coupled to the heat supplying resistor. When a state of the bridge circuit becomes disturbed due to an alteration of a temperature of the heat generating resistor as caused by variation of a flow rate of air detected by a change of the temperature of the temperature determining resistor, a heating current flowing through the heat supplying resistor is conveniently controlled through cooperation of the differential amplifiers and the transistor so that a balanced state of the bridge circuit is restored.

The device further includes a mechanism for interrupting power to the first temperature maintaining mechanism when the applied pressure is discontinued for a predetermined time period. The second operating temperature effectively remains unchanged when the applied pressure is discontinued and the second operating temperature is lower than the first operating temperature during grooming procedures.

The power interrupting mechanism advantageously includes a plurality of pressure sensors electrically coupled to the heating elements respectively. Such pressure sensors conveniently generate and transmit a plurality of control signals based upon the detected applied pressure during grooming operations. A pressure comparison circuit is electrically coupled to the pressure sensors and effectively receives the control signals respectively. Such a pressure comparison circuit advantageously detects elapsed time periods between each of the control signals and compares the elapsed time periods with a predetermined threshold time period. A switch is electrically coupled to the first temperature maintaining mechanism and the power source and the timer comparison circuit conveniently generates and transmits operating signals to such a switch in such a manner that the switch is automatically adapted between open and closed positions when the elapsed time period is greater than a predetermined threshold time period so that the first operating temperature drops to ambient temperature.

The timer comparison circuit includes a processor, a memory electrically coupled to the processor, and a logic gate electrically coupled to the processor. Such a memory includes software instructions that cause the power interrupting mechanism to effectively discontinue power to the heating elements when the elapsed time period is greater than the predetermined threshold time period. The software instructions include and execute a control logic algorithm which includes the steps of: detecting a first receipt time associated with a first one of the control signals; detecting a second receipt time associated with a second one of the control signals; calculating the lapsed time period between the first and second receipt times; comparing the lapsed time period with the threshold time period; if the lapsed time period is greater than the threshold time period, then generating and transmitting a true output signal to the logic gate; and if the lapsed time period is less than the threshold time period, then generating and transmitting a false output signal to the logic gate. Such a logic gate advantageously generates and transmits a first type of the operating signal that causes the switch to toggle to the off position when the true output signal is detected. The logic gate then conveniently generates and transmits a second type of the operating signal that causes the switch to toggle to the on position when the false output signal is detected.

A method for grooming a pet with a heatable brush includes the step of providing a brush that includes a body provided with a proximally located gripping end and a distally located brushing end. Such a brushing end has oppositely facing first and second surfaces. Such a first surface includes a first plurality of bristles extending outwardly therefrom. Such a second surface has a second plurality of bristles extending outwardly therefrom. The first and second pluralities of bristles have unique first and second operating temperatures respectively.

The method further includes these steps of: providing a rechargeable battery seated within a cavity of the brush; providing a recharging base station electrically mateable to an external power supply source wherein the battery is electrically engaged with the external power supply source when the gripping end is seated within the base station during non-operating conditions; providing a user interface situated on the gripping end of the brush; consistently maintaining the first plurality of bristles at the first operating temperature while a caregiver is grooming the animal and applying pressure against the first plurality of bristles; and interrupting power to the first temperature maintaining mechanism when the applied pressure is discontinued for a predetermined time period. The second operating temperature remains unchanged when the applied pressure is discontinued and the second operating temperature is lower than the first operating temperature during grooming procedures.

The method further includes these steps of: providing a plurality of heating elements operably coupled to the first plurality of bristles and providing a bridge circuit electrically coupled to the heating elements. Such a bridge circuit including a heat supplying resistor, a temperature determining resistor, a plurality of unchanging resistors electrically coupled to the heat supplying resistor and the temperature determining resister, a plurality of differential amplifiers coupled to heat supplying resister and the temperature determining resistor, and a transistor electrically coupled to the heat supplying resistor. When a state of the bridge circuit becomes disturbed due to an alteration of a temperature of the heat generating resistor as caused by variation of a flow rate of air detected by a change of the temperature of the temperature determining resistor, a heating current flowing through the heat supplying resistor is controlled through cooperation of the differential amplifiers and the transistor so that a balanced state of the bridge circuit is restored.

The method further includes these steps of: electrically coupling a plurality of pressure sensors to the heating elements respectively wherein each of the pressure sensors generates and transmits a plurality of control signals based upon the detected applied pressure during grooming operations; electrically coupling a pressure comparison circuit to the pressure sensors and receiving the control signals respectively wherein the pressure comparison circuit detects elapsed time periods between each of the control signals and compares the elapsed time periods with a predetermined threshold time period; and electrically coupling a switch to the power source wherein the timer comparison circuit generates and transmits operating signals to the switch in such a manner that the switch is automatically adapted between open and closed positions when the elapsed time period is greater than a predetermined threshold time period so that the first operating temperature drops to ambient temperature.

The method further includes these steps of: providing a processor; providing a memory electrically coupled to the processor; and providing a logic gate electrically coupled to the processor. Such memory includes software instructions that cause the power interrupting mechanism to discontinue power to the heating elements when the elapsed time period is greater than the predetermined threshold time period.

Such software instructions include and execute a control logic algorithm including the steps of: detecting a first receipt time associated with a first one of the control signals; detecting a second receipt time associated with a second one of the control signals; calculating the lapsed time period between the first and second receipt times; comparing the lapsed time period with the threshold time period; if the lapsed time period is greater than the threshold time period, then generating and transmitting a true output signal to the logic gate; and if the lapsed time period is less than the threshold time period, then generating and transmitting a false output signal to the logic gate. The logic gate generates and transmits a first type of the operating signal that causes the switch to toggle to the off position when the true output signal is detected. The logic gate generates and transmits a second type of the operating signal that causes the switch to toggle to the on position when the false output signal is detected.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1-9 and is intended to represent a heated pet brush. It should be understood that the device may be used to heat many different types of brushes and should not be limited in use to only heating pet brushes.

Figure 1:
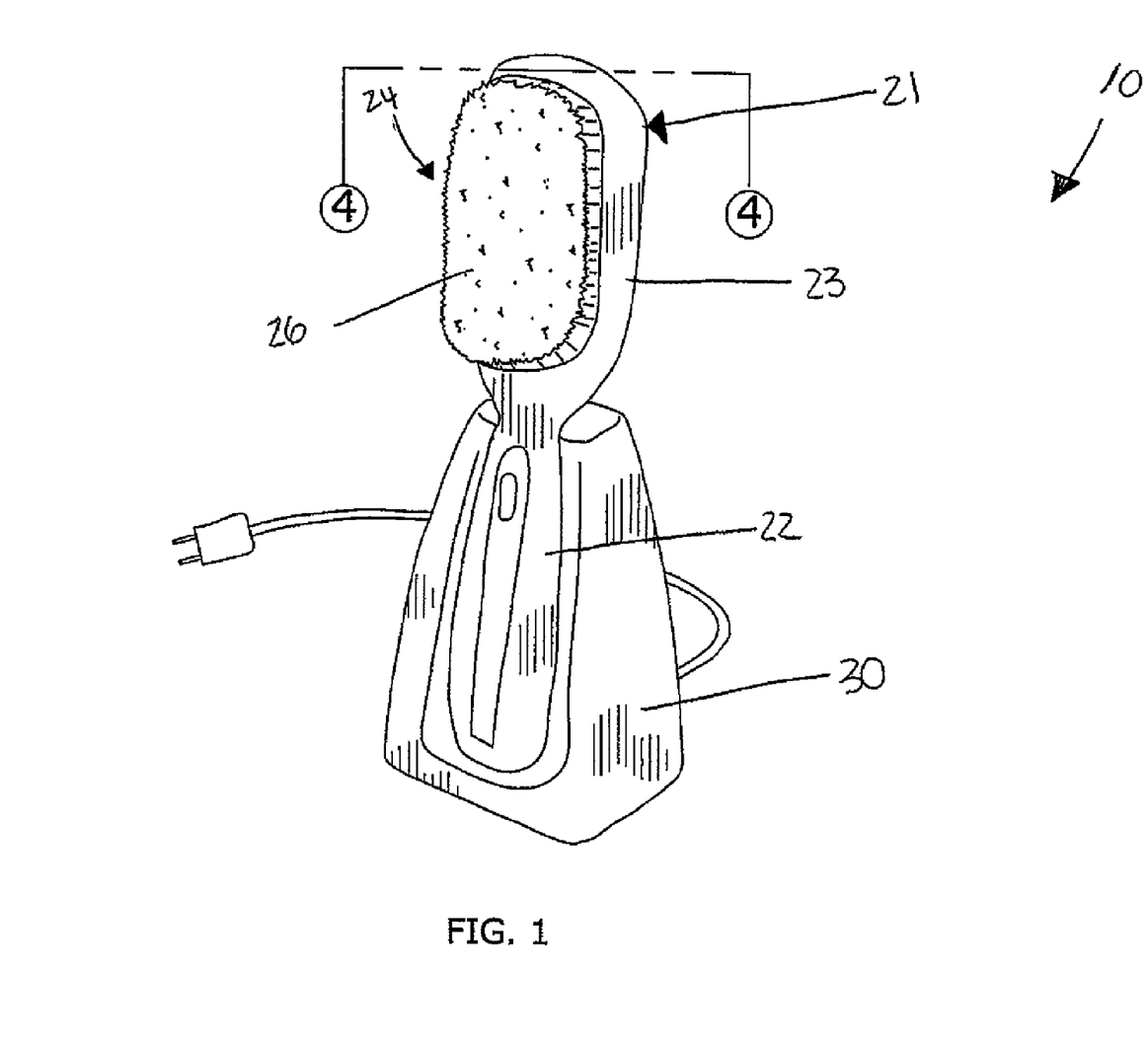
FIG. 1 is a front perspective view showing a first side of a heated pet brush and base station, in accordance with the present invention.
Figure 2:
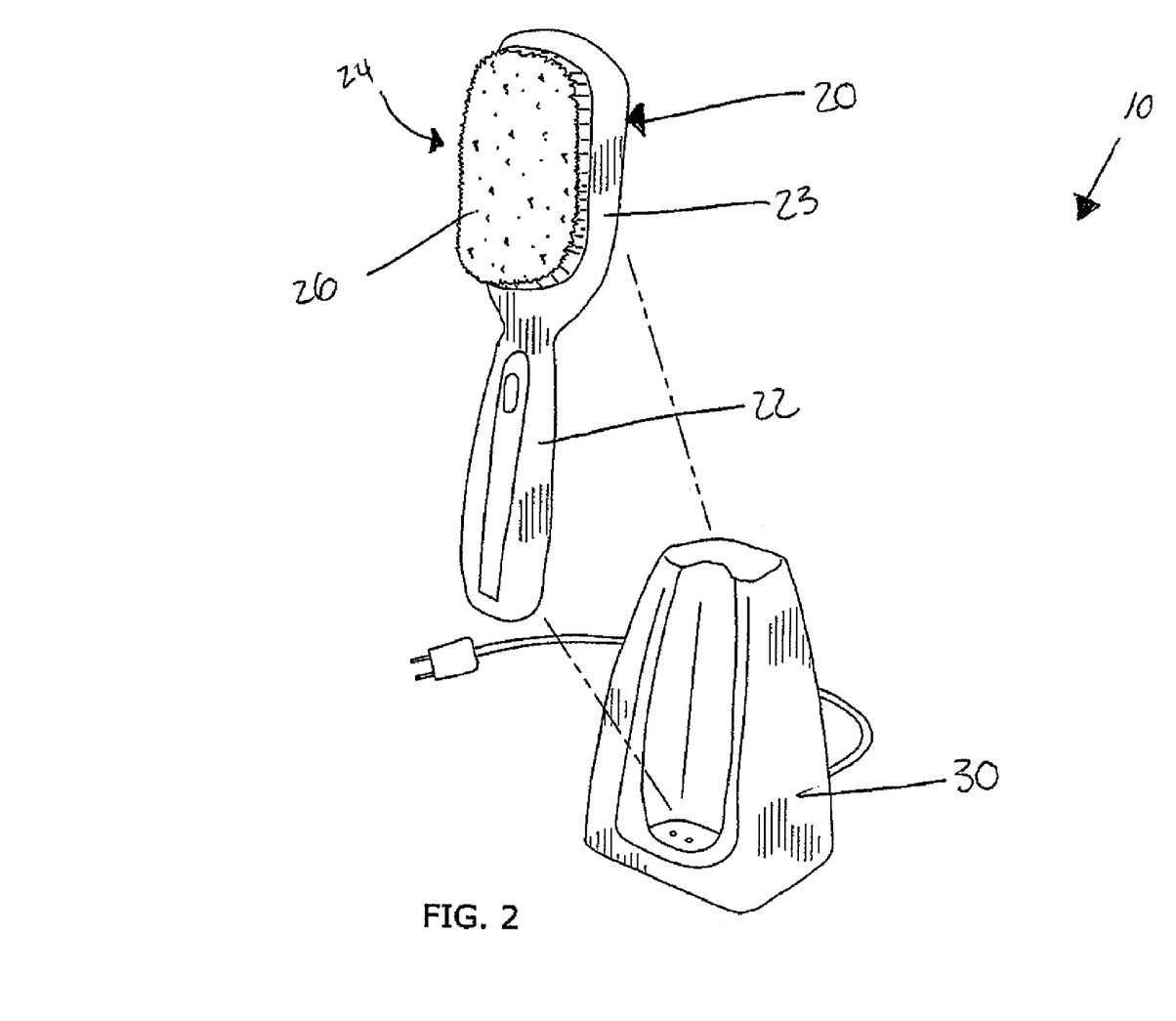
FIG. 2 is a front perspective view showing a heated pet brush being removed from the base station, in accordance with the present invention.
Figure 3:
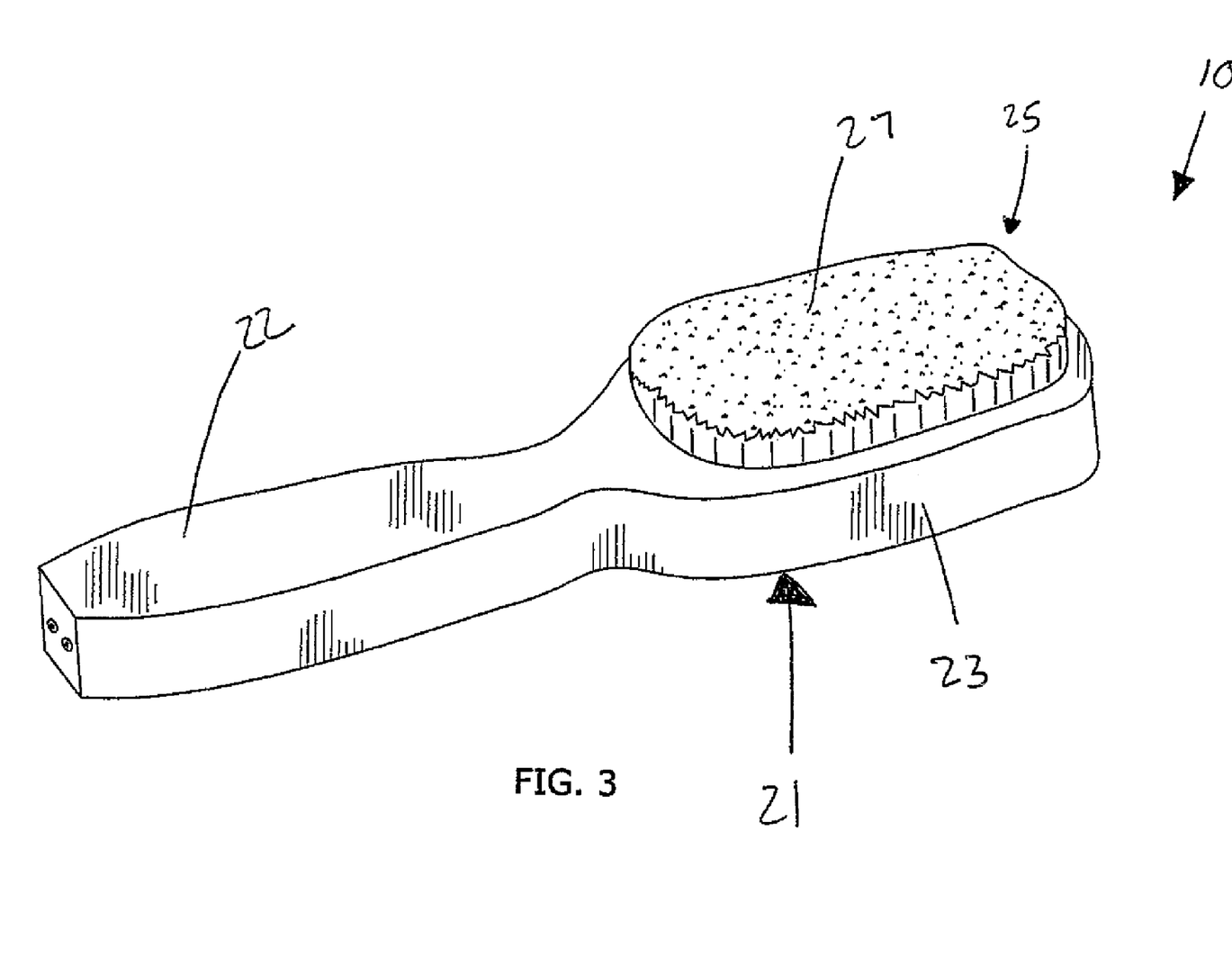
FIG. 3 is a rear perspective view showing a second side of the heated pet brush, in accordance with the present invention.

Referring initially to FIGS. 1, 2 and 3, the device includes a brush 20 that includes a body 21 provided with a proximally located gripping end 22 and a distally located brushing end 23. Such a brushing end has oppositely facing first 24 and second surfaces 25. Such a first surface 24 includes a first plurality of bristles 26 extending outwardly therefrom. Such a second surface 25 has a second plurality of bristles 27 extending outwardly therefrom. Such first and second pluralities of bristles 26, 27 conveniently have unique first and second operating temperatures respectively. The first and second surfaces 24, 25 of the brush allow a user to alternate between the bristles that will be most advantageous for their grooming needs.

Figure 5:
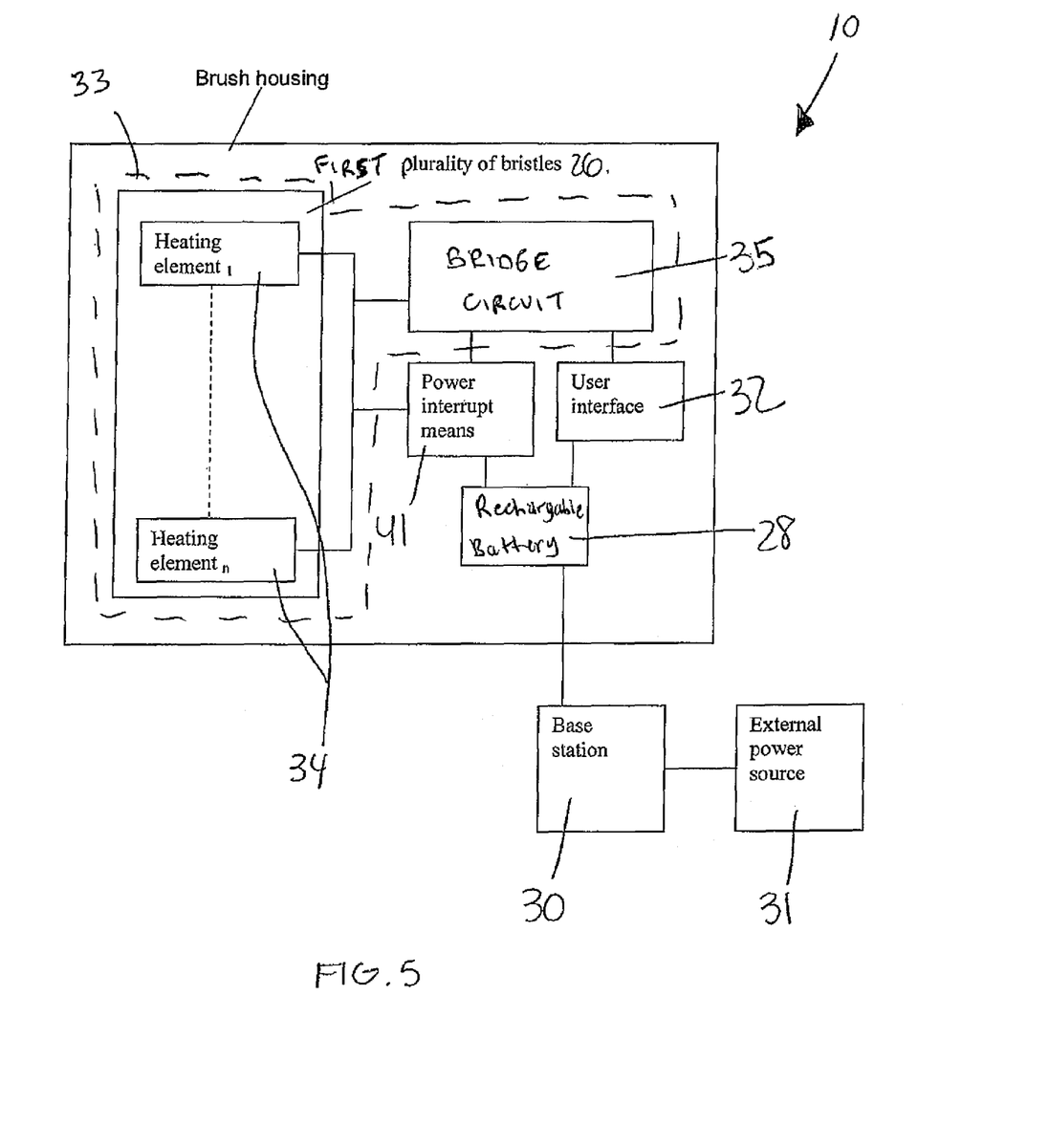
FIG. 5 is a schematic block diagram of the device shown in FIG. 3.

Referring to FIG. 5, the device 10 further includes a rechargeable battery 28 seated within a cavity 29 of the brush and a recharging base station 30 electrically mateable to an external power supply source 31. Such a battery 28 is electrically engaged with the external power supply source 31 when the gripping end 22 is seated within the base station 30 during non-operating conditions, as perhaps best shown in FIGS. 1 and 2. The rechargeable battery 28 provides a user the convenience of therapeutically grooming their pet without cumbersome wires getting in the way.

Figure 4:
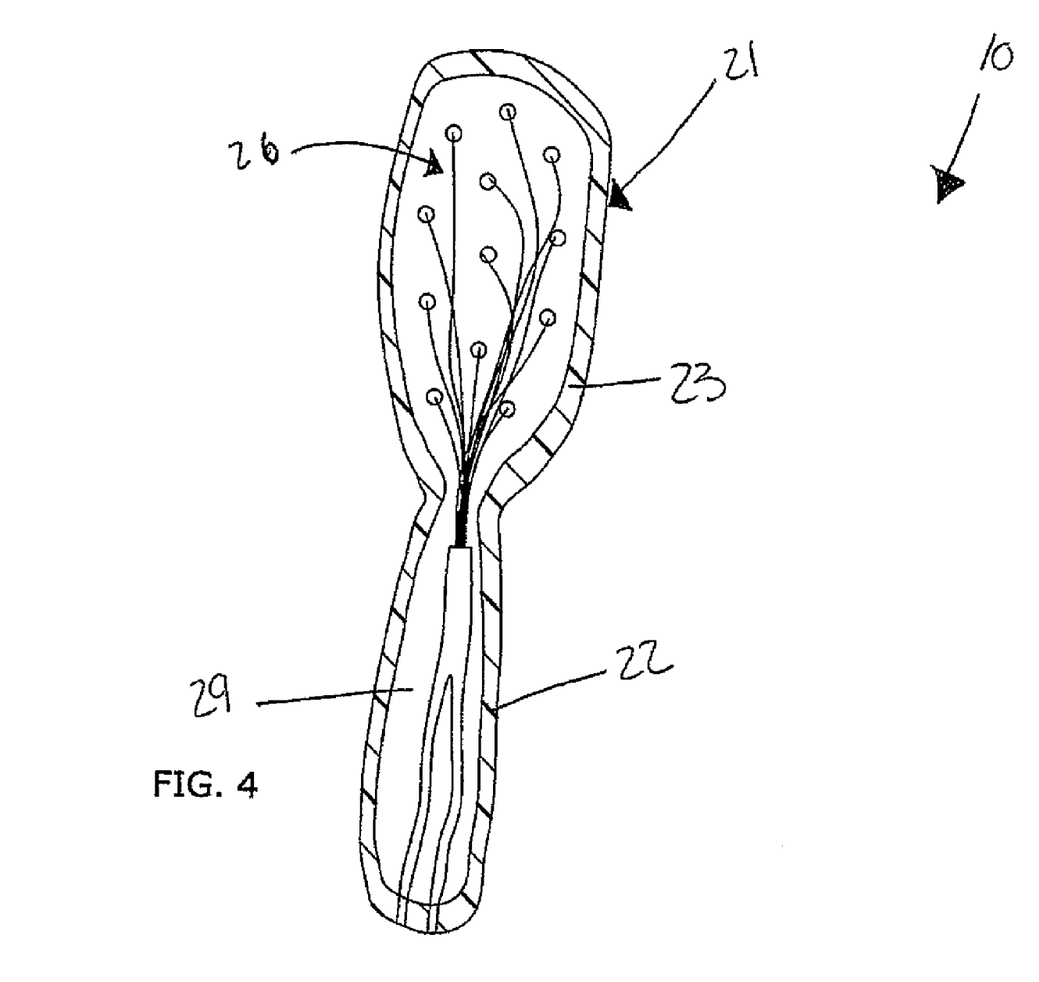
FIG. 4 is a cross-sectional view showing an interior of the heated pet brush, taken along line 4-4.
Figure 9:
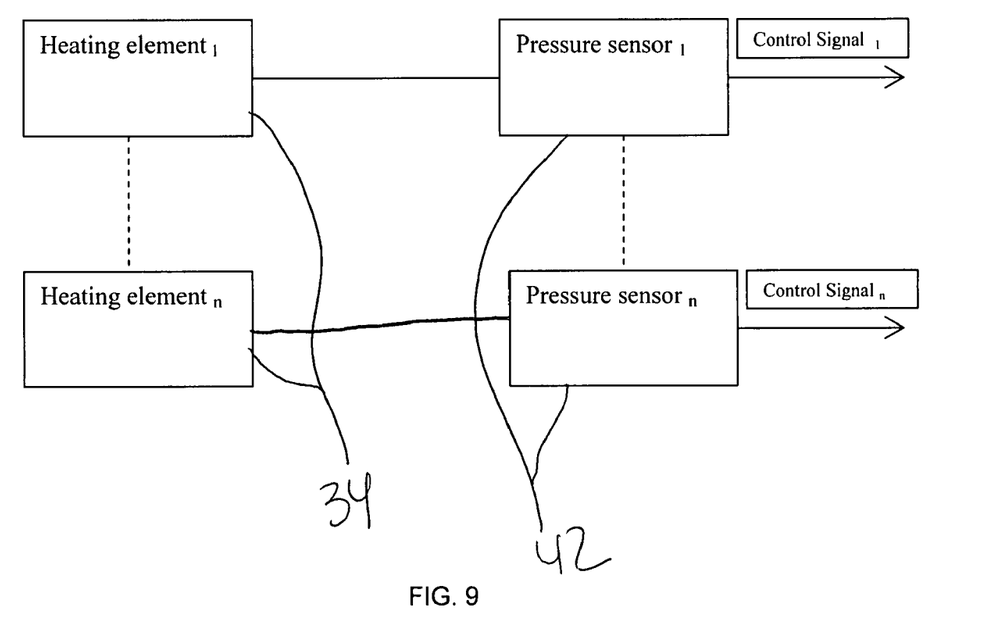
FIG. 9 is a schematic block diagram showing the heating elements and pressure sensors, in accordance with the presence invention.

Referring to FIGS. 4, 5 and 9, the device further includes a user interface 32 situated on the gripping end 22 of the brush and a mechanism for consistently maintaining the first plurality of bristles 26 at the first operating temperature while a caregiver is grooming the animal and applying pressure against the first plurality of bristles 26. Such a first temperature maintaining mechanism 33 effectively includes a plurality of heating elements 34 operably coupled to the first plurality of bristles 26 and a bridge circuit 35 electrically coupled to the heating elements 34. Such a bridge circuit 35 advantageously includes a heat supplying resistor 36, a temperature determining resistor 37, a plurality of unchanging resistors 38 electrically coupled to the heat supplying resistor and the temperature determining resister. A plurality of differential amplifiers 39 are coupled to such a heat supplying resister 36 and such a temperature determining resistor 37, and a transistor 40 is electrically coupled to the heat supplying resistor 36. When a state of the bridge circuit 35 becomes disturbed due to an alteration of a temperature of the heat generating resistor as caused by variation of a flow rate of air detected by a change of the temperature of the temperature determining resistor 37, a heating current flowing through the heat supplying resistor 36 is conveniently controlled through cooperation of the differential amplifiers 39 and the transistor 40 which is essential so that a balanced state of the bridge circuit 35 is restored. The temperature maintaining mechanisms allow a user to administer heat therapy to their pet without worrying about accidentally burning themselves or their pet.

Figure 6:
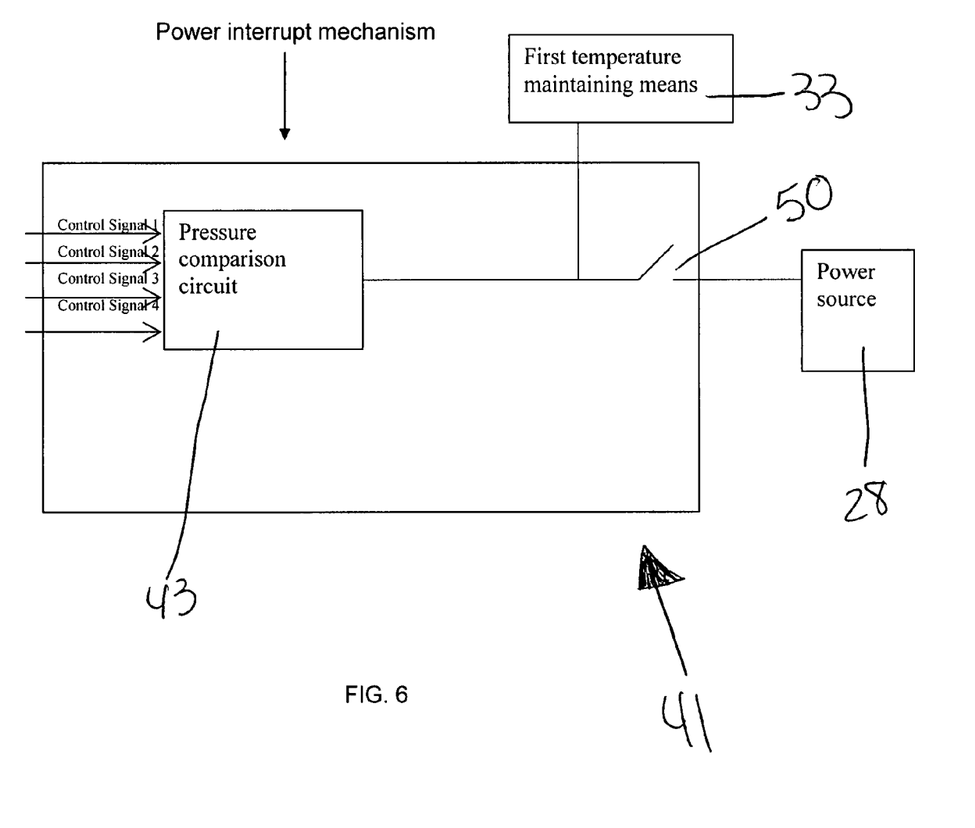
FIG. 6 is a schematic block diagram of the power interrupt mechanism as shown in FIG. 5.

Referring to FIGS. 6 and 9, the device further includes a mechanism for interrupting power 41 to the first temperature maintaining mechanism 33 when the applied pressure is discontinued for a predetermined time period. The second operating temperature effectively remains unchanged when the applied pressure is discontinued and the second operating temperature is lower than the first operating temperature during grooming procedures.

Referring again to FIGS. 6 and 9, the power interrupting mechanism 41 advantageously includes a plurality of pressure sensors 42 electrically coupled to the heating elements 34 respectively. Such pressure sensors 42 conveniently generate and transmit a plurality of control signals based upon the detected applied pressure during grooming operations. A pressure comparison circuit 43 is electrically coupled to the pressure sensors 42 and effectively receives the control signals respectively. Such a pressure comparison circuit 43 advantageously detects elapsed time periods between each of the control signals and compares the elapsed time periods with a predetermined threshold time period. A switch 50 is electrically coupled to the first temperature maintaining mechanism 33 and the power source 28 and the pressure comparison circuit 43 conveniently generates and transmits operating signals to such a switch 50 in such a manner that the switch 50 is automatically adapted between open and closed positions when the elapsed time period is greater than a predetermined threshold time period which is critical so that the first operating temperature drops to ambient temperature. The pressure sensors 42 allow a user to activate the heating mechanism 34 of the pet brush only when a user is actively brushing their pet.

Figure 7:
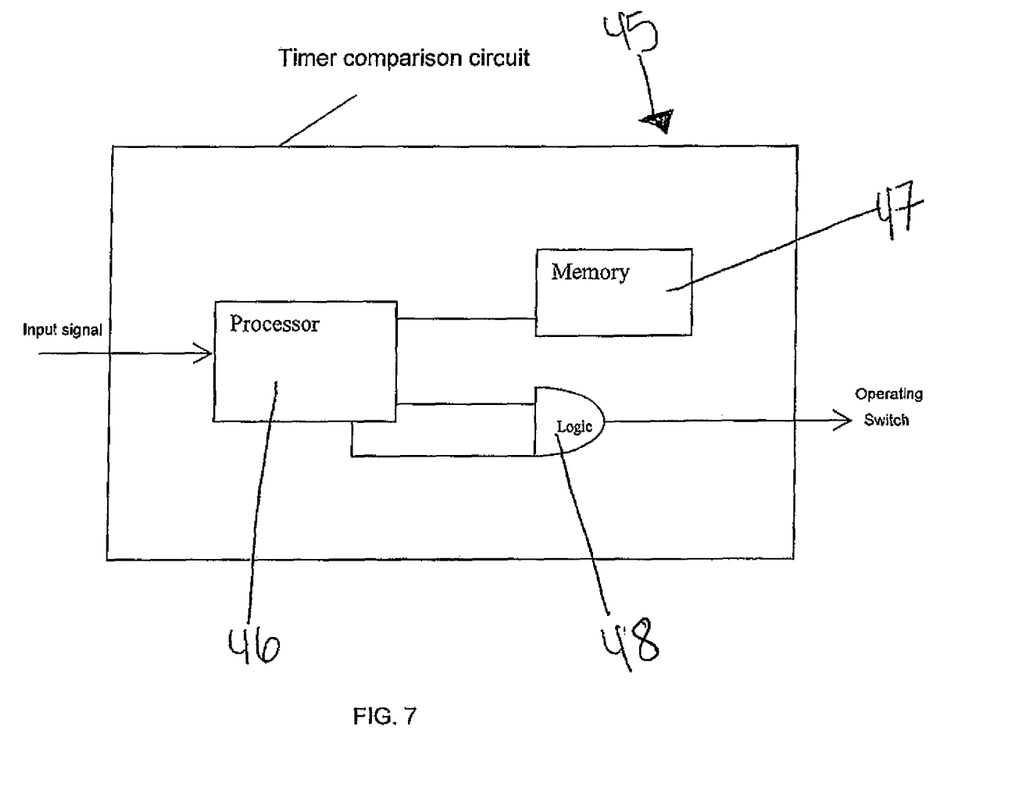
FIG. 7 is a schematic block diagram of the timer comparison circuit, in accordance with the present invention.
Figure 8:
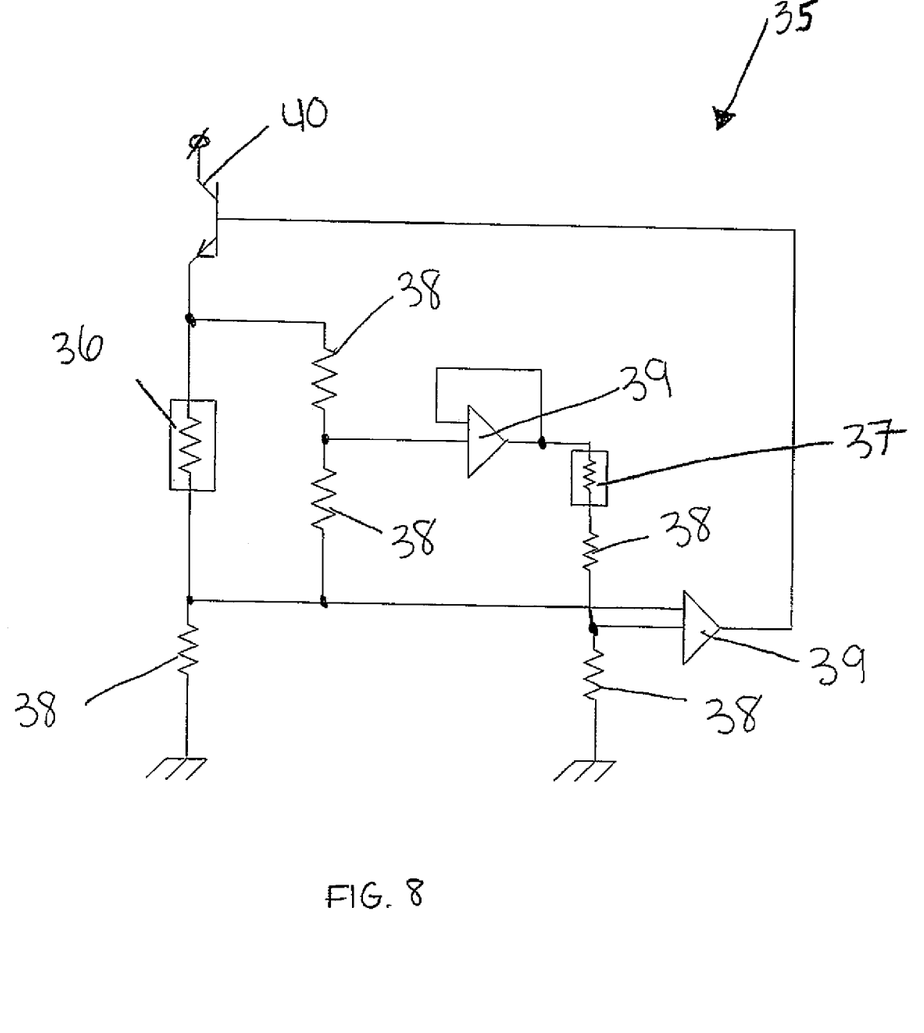
FIG. 8 is a schematic block diagram showing a first temperature maintaining mechanism as shown in FIG. 6.

Referring to FIG. 7, the timer comparison circuit 45 includes a processor 46, a memory 47 electrically coupled to the processor, and a logic gate 48 electrically coupled to the processor 46. Such a memory 47 includes software instructions 49 that cause the power interrupting mechanism 41 to effectively discontinue power to the heating elements 34 when the elapsed time period is greater than the predetermined threshold time period. The software instructions 49 include and execute a control logic algorithm which includes the steps of: detecting a first receipt time associated with a first one of the control signals; detecting a second receipt time associated with a second one of the control signals; calculating the lapsed time period between the first and second receipt times; comparing the lapsed time period with the threshold time period; if the lapsed time period is greater than the threshold time period, then generating and transmitting a true output signal to the logic gate; and if the lapsed time period is less than the threshold time period, then generating and transmitting a false output signal to the logic gate 48. Such a logic gate 48 advantageously generates and transmits a first type of the operating signal that causes the switch 50 to toggle to the off position when the true output signal is detected. The logic gate 48 then conveniently generates and transmits a second type of the operating signal that causes the switch 50 to toggle to the on position when the false output signal is detected. The memory and processor will automatically turn off the heating elements when a predetermined amount of time has passed.

The pressure sensors 42 provide a user the unexpected benefit of ensuring that the heated pet brush will only remain heated while the brush is being used on a pet, thereby preventing wasted battery use or potential fire hazards. In addition, the rechargeable battery provides a user the unexpected benefit of issuing heat therapy to their pet on a daily basis without inconveniently needing to change the batteries in the device. Such benefits overcome the prior art shortcomings.

In use, the heated pet brush is simple and straightforward to use. A method for grooming a pet with a heatable brush includes the step of providing a brush 20 that includes a body 21 provided with a proximally located gripping end 22 and a distally located brushing end 23. Such a brushing end 23 has oppositely facing first 24 and second surfaces 25. Such a first surface 24 includes a first plurality of bristles 26 extending outwardly therefrom. Such a second surface 25 has a second plurality of bristles 27 extending outwardly therefrom. The first and second pluralities of bristles 26, 27 have unique first and second operating temperatures respectively.

In use, the method further includes these steps of: providing a rechargeable battery 28 seated within a cavity 29 of the brush; providing a recharging base station 30 electrically mateable to an external power supply source 31 wherein the battery 28 is electrically engaged with the external power supply source 31 when the gripping end 22 is seated within the base station 30 during non-operating conditions; providing a user interface situated on the gripping end 22 of the brush; consistently maintaining the first plurality of bristles 26. 27 at the first operating temperature while a caregiver is grooming the animal and applying pressure against the first plurality of bristles 26; and interrupting power to the first temperature maintaining mechanism 33 when the applied pressure is discontinued for a predetermined time period. The second operating temperature remains unchanged when the applied pressure is discontinued and the second operating temperature is lower than the first operating temperature during grooming procedures.

In use, the method further includes these steps of: providing a plurality of heating elements 34 operably coupled to the first plurality of bristles 26 and providing a bridge circuit 35 electrically coupled to the heating elements 34. Such a bridge circuit 35 including a heat supplying resistor 36, a temperature determining resistor 37, a plurality of unchanging resistors 38 electrically coupled to the heat supplying resistor 36 and the temperature determining resister 37, a plurality of differential amplifiers 39 coupled to heat supplying resister 36 and the temperature determining resistor 37, and a transistor 40 electrically coupled to the heat supplying resistor 36. When a state of the bridge circuit 35 becomes disturbed due to an alteration of a temperature of the heat generating resistor 36 as caused by variation of a flow rate of air detected by a change of the temperature of the temperature determining resistor 37, a heating current flowing through the heat supplying resistor 36 is controlled through cooperation of the differential amplifiers 39 and the transistor 40 so that a balanced state of the bridge circuit is restored.

In use, the method further includes these steps of: electrically coupling a plurality of pressure sensors 42 to the heating elements 34 respectively wherein each of the pressure sensors 42 generates and transmits a plurality of control signals based upon the detected applied pressure during grooming operations; electrically coupling a pressure comparison circuit 43 to the pressure sensors 42 and receiving the control signals respectively wherein the pressure comparison circuit 43 detects elapsed time periods between each of the control signals and compares the elapsed time periods with a predetermined threshold time period; and electrically coupling a switch 44 to the power source 31 wherein the timer comparison circuit 45 generates and transmits operating signals to the switch 44 in such a manner that the switch 44 is automatically adapted between open and closed positions when the elapsed time period is greater than a predetermined threshold time period so that the first operating temperature drops to ambient temperature.

The method further includes these steps of: providing a processor 46; providing a memory 47 electrically coupled to the processor 46; and providing a logic gate 49 electrically coupled to the processor 46. Such memory 47 includes software instructions that cause the power interrupting mechanism 41 to discontinue power to the heating elements 34 when the elapsed time period is greater than the predetermined threshold time period.

Such software instructions include and execute a control logic algorithm including the steps of: detecting a first receipt time associated with a first one of the control signals; detecting a second receipt time associated with a second one of the control signals; calculating the lapsed time period between the first and second receipt times; comparing the lapsed time period with the threshold time period; if the lapsed time period is greater than the threshold time period, then generating and transmitting a true output signal to the logic gate 49; and if the lapsed time period is less than the threshold time period, then generating and transmitting a false output signal to the logic gate 49. The logic gate 49 generates and transmits a first type of the operating signal that causes the switch 44 to toggle to the off position when the true output signal is detected. The logic gate 49 generates and transmits a second type of the operating signal that causes the switch 44 to toggle to the on position when the false output signal is detected.

What is claimed as new and what is desired to secure by Letters Patent of the United States is:

1. A heated pet brush for allowing a pet owner to effectively and conveniently administer soothing heat therapy when brushing an animal, said heated pet brush comprising:
   a brush including a body provided with a proximally located gripping end and a distally located brushing end, said brushing end having oppositely facing first and second surfaces, said first surface including a first plurality of bristles extending outwardly therefrom, said second surface having a second plurality of bristles extending outwardly therefrom, said first and second plurality of bristles having unique first and second operating temperatures respectively;
   a rechargeable battery seated within a cavity of said brush;
   a recharging base station electrically mateable to an external power supply source, said battery being electrically engaged with said external power supply source when said gripping end is seated within said base station during non-operating conditions;
   a user interface situated on said gripping end of said brush;
   means for consistently maintaining said first plurality of bristles at said first operating temperature while a caregiver is grooming the animal and applying pressure against said first plurality of bristles; and
   means for interrupting power to said first temperature maintaining means when the applied pressure is discontinued for a predetermined time period;
   wherein said second operating temperature remains unchanged when the applied pressure is discontinued.

2. The heated brush of claim 1, wherein said first temperature maintaining means comprises:
   a plurality of heating elements operably coupled to said first plurality of bristles; and
   a bridge circuit electrically coupled to said heating elements, said bridge circuit including
   a heat supplying resistor,
   a temperature determining resistor,
   a plurality of unchanging resistors electrically coupled to said heat supplying resistor and said temperature determining resister,
   a plurality of differential amplifiers coupled to heat supplying resister and said temperature determining resistor, and
   a transistor electrically coupled to said heat supplying resistor;
   wherein when a state of said bridge circuit becomes disturbed due to an alteration of a temperature of said heat generating resistor as caused by variation of a flow rate of air detected by a change of the temperature of said temperature determining resistor, a heating current flowing through said heat supplying resistor is controlled through cooperation of said differential amplifiers and said transistor so that a balanced state of said bridge circuit is restored.

3. The heated brush of claim 2, wherein said power interrupting means comprises:
   a plurality of pressure sensors electrically coupled to said heating elements respectively, each of said pressure sensors generating and transmitting a plurality of control signals based upon the detected applied pressure during grooming operations;
   a pressure comparison circuit electrically coupled to said pressure sensors and receiving said control signals respectively, said pressure comparison circuit detecting elapsed time periods between each of said control signals and comparing said elapsed time periods with a predetermined threshold time period; and
   a switch electrically coupled to said first temperature maintaining means and said power source, said timer comparison circuit generating and transmitting operating signals to said switch in such a manner that said switch is automatically adapted between open and closed positions when said elapsed time period is greater than a predetermined threshold time period so that said first operating temperature drops to ambient temperature.

4. The heated brush of claim 3, wherein said timer comparison circuit comprises:
   a processor;
   a memory electrically coupled to said processor; and
   a logic gate electrically coupled to said processor;
   wherein said memory includes software instructions that cause said power interrupting means to discontinue power to said heating elements when said elapsed time period is greater than the predetermined threshold time period, said software instructions including and executing a control logic algorithm including the steps of
   a. detecting a first receipt time associated with a first one of said control signals;
   b. detecting a second receipt time associated with a second one of said control signals;
   c. calculating said lapsed time period between said first and second receipt times;
   d. comparing said lapsed time period with the threshold time period;
   e. if said lapsed time period is greater than said threshold time period, then generating and transmitting a true output signal to said logic gate; and
   f. if said lapsed time period is less than said threshold time period, then generating and transmitting a false output signal to said logic gate;

wherein said logic gate generates and transmits a first type of said operating signal that causes said switch to toggle to the off position when said true output signal is detected;

wherein said logic gate generates and transmits a second type of said operating signal that causes said switch to toggle to the on position when said false output signal is detected.

5. A heated pet brush for allowing a pet owner to effectively and conveniently administer soothing heat therapy when brushing an animal, said heated pet brush comprising:

a brush including a body provided with a proximally located gripping end and a distally located brushing end, said brushing end having oppositely facing first and second surfaces, said first surface including a first plurality of bristles extending outwardly therefrom, said second surface having a second plurality of bristles extending outwardly therefrom, said first and second plurality of bristles having unique first and second operating temperatures respectively;

a rechargeable battery seated within a cavity of said brush;

a recharging base station electrically mateable to an external power supply source, said battery being electrically engaged with said external power supply source when said gripping end is seated within said base station during non-operating conditions;

a user interface situated on said gripping end of said brush;

means for consistently maintaining said first plurality of bristles at said first operating temperature while a caregiver is grooming the animal and applying pressure against said first plurality of bristles; and means for interrupting power to said first temperature maintaining means when the applied pressure is discontinued for a predetermined time period;

wherein said second operating temperature remains unchanged when the applied pressure is discontinued;

wherein said second operating temperature is lower than said first operating temperature during grooming procedures.

6. The heated brush of claim 5, wherein said first temperature maintaining means comprises:

a plurality of heating elements operably coupled to said first plurality of bristles; and a bridge circuit electrically coupled to said heating elements, said bridge circuit including a heat supplying resistor, a temperature determining resistor, a plurality of unchanging resistors electrically coupled to said heat supplying resistor and said temperature determining resister, a plurality of differential amplifiers coupled to heat supplying resister and said temperature determining resistor, and a transistor electrically coupled to said heat supplying resistor;

wherein when a state of said bridge circuit becomes disturbed due to an alteration of a temperature of said heat generating resistor as caused by variation of a flow rate of air detected by a change of the temperature of said temperature determining resistor, a heating current flowing through said heat supplying resistor is controlled through cooperation of said differential amplifiers and said transistor so that a balanced state of said bridge circuit is restored.

7. The heated brush of claim 6, wherein said power interrupting means comprises:

a plurality of pressure sensors electrically coupled to said heating elements respectively, each of said pressure sensors generating and transmitting a plurality of control signals based upon the detected applied pressure during grooming operations;

a pressure comparison circuit electrically coupled to said pressure sensors and receiving said control signals respectively, said pressure comparison circuit detecting elapsed time periods between each of said control signals and comparing said elapsed time periods with a predetermined threshold time period; and a switch electrically coupled to said first temperature maintaining means and said power source, said timer comparison circuit generating and transmitting operating signals to said switch in such a manner that said switch is automatically adapted between open and closed positions when said elapsed time period is greater than a predetermined threshold time period so that said first operating temperature drops to ambient temperature.

8. The heated brush of claim 7, wherein said timer comparison circuit comprises:

a processor;

a memory electrically coupled to said processor; and a logic gate electrically coupled to said processor;

wherein said memory includes software instructions that cause said power interrupting means to discontinue power to said heating elements when said elapsed time period is greater than the predetermined threshold time period, said software instructions including and executing a control logic algorithm including the steps of a. detecting a first receipt time associated with a first one of said control signals;

b. detecting a second receipt time associated with a second one of said control signals;

c. calculating said lapsed time period between said first and second receipt times;

d. comparing said lapsed time period with the threshold time period;

e. if said lapsed time period is greater than said threshold time period, then generating and transmitting a true output signal to said logic gate; and f. if said lapsed time period is less than said threshold time period, then generating and transmitting a false output signal to said logic gate;

wherein said logic gate generates and transmits a first type of said operating signal that causes said switch to toggle to the off position when said true output signal is detected;

wherein said logic gate generates and transmits a second type of said operating signal that causes said switch to toggle to the on position when said false output signal is detected.

9. A method for grooming a pet with a heatable brush, said method comprising the steps of:

a. providing a brush including a body provided with a proximally located gripping end and a distally located brushing end, said brushing end having oppositely facing first and second surfaces, said first surface including a first plurality of bristles extending outwardly therefrom, said second surface having a second plurality of bristles extending outwardly therefrom, said first and second plurality of bristles having unique first and second operating temperatures respectively;

b. providing a rechargeable battery seated within a cavity of said brush;

c. providing a recharging base station electrically mateable to an external power supply source, said battery being electrically engaged with said external power supply source when said gripping end is seated within said base station during non-operating conditions;

d. providing a user interface situated on said gripping end of said brush;

e. consistently maintaining said first plurality of bristles at said first operating temperature while a caregiver is grooming the animal and applying pressure against said first plurality of bristles; and f. interrupting power to said first temperature maintaining means when the applied pressure is discontinued for a predetermined time period;

wherein said second operating temperature remains unchanged when the applied pressure is discontinued;

wherein said second operating temperature is lower than said first operating temperature during grooming procedures.

10. The method of claim 9, wherein step e. comprises the steps of:

a. providing a plurality of heating elements operably coupled to said first plurality of bristles; and b. providing a bridge circuit electrically coupled to said heating elements, said bridge circuit including a heat supplying resistor, a temperature determining resistor, a plurality of unchanging resistors electrically coupled to said heat supplying resistor and said temperature determining resister, a plurality of differential amplifiers coupled to heat supplying resister and said temperature determining resistor, and a transistor electrically coupled to said heat supplying resistor;

wherein when a state of said bridge circuit becomes disturbed due to an alteration of a temperature of said heat generating resistor as caused by variation of a flow rate of air detected by a change of the temperature of said temperature determining resistor, a heating current flowing through said heat supplying resistor is controlled through cooperation of said differential amplifiers and said transistor so that a balanced state of said bridge circuit is restored.

11. The method of claim 10, wherein step f. comprises the steps of:

a. electrically coupling a plurality of pressure sensors to said heating elements respectively, each of said pressure sensors generating and transmitting a plurality of control signals based upon the detected applied pressure during grooming operations;

b. electrically coupling a pressure comparison circuit to said pressure sensors and receiving said control signals respectively, said pressure comparison circuit detecting elapsed time periods between each of said control signals and comparing said elapsed time periods with a predetermined threshold time period; and c. electrically coupling a switch to said power source, said timer comparison circuit generating and transmitting operating signals to said switch in such a manner that said switch is automatically adapted between open and closed positions when said elapsed time period is greater than a predetermined threshold time period so that said first operating temperature drops to ambient temperature.

12. The heated brush of claim 11, wherein step b. comprises:

a. providing a processor;

b. providing a memory electrically coupled to said processor; and c. providing a logic gate electrically coupled to said processor;

wherein said memory includes software instructions that cause said power interrupting means to discontinue power to said heating elements when said elapsed time period is greater than the predetermined threshold time period, said software instructions including and executing a control logic algorithm including the steps of detecting a first receipt time associated with a first one of said control signals;

detecting a second receipt time associated with a second one of said control signals;

calculating said lapsed time period between said first and second receipt times;

comparing said lapsed time period with the threshold time period;

if said lapsed time period is greater than said threshold time period, then generating and transmitting a true output signal to said logic gate; and if said lapsed time period is less than said threshold time period, then generating and transmitting a false output signal to said logic gate;

wherein said logic gate generates and transmits a first type of said operating signal that causes said switch to toggle to the off position when said true output signal is detected;

wherein said logic gate generates and transmits a second type of said operating signal that causes said switch to toggle to the on position when said false output signal is detected.

* * * * *